United States Patent
Czerepinski

(10) Patent No.: US 9,084,211 B2
(45) Date of Patent: Jul. 14, 2015

(54) METHODS AND SYSTEMS FOR WIRELESS COMMUNICATION IN HETEROGENEOUS NETWORKS

(71) Applicant: Research In Motion Limited, Waterloo (CA)

(72) Inventor: Przemyslaw Czerepinski, Bristol (GB)

(73) Assignee: BlackBerry Limited, Waterloo, Ontario (CA)

(*) Notice: Subject to any disclaimer, the term of this patent is extended or adjusted under 35 U.S.C. 154(b) by 134 days.

(21) Appl. No.: 13/891,847

(22) Filed: May 10, 2013

(65) Prior Publication Data

US 2014/0335909 A1 Nov. 13, 2014

(51) Int. Cl.
| | | |
|---|---|---|
| H04L 12/26 | (2006.01) | |
| H04W 52/40 | (2009.01) | |
| H04W 24/02 | (2009.01) | |
| H04W 84/04 | (2009.01) | |

(52) U.S. Cl.
CPC .............. *H04W 52/40* (2013.01); *H04W 24/02* (2013.01); *H04W 84/045* (2013.01)

(58) Field of Classification Search
USPC .............. 455/522, 453, 436, 435.1, 424, 439, 455/418; 370/252, 329
See application file for complete search history.

(56) References Cited

U.S. PATENT DOCUMENTS

| | | | |
|---|---|---|---|
| 2007/0275722 A1* | 11/2007 | Thorson et al. ............... | 455/436 |
| 2010/0035647 A1* | 2/2010 | Gholmieh et al. ............ | 455/522 |
| 2010/0144339 A1* | 6/2010 | Hasegawa et al. ............ | 455/424 |
| 2010/0184437 A1* | 7/2010 | Dimou et al. ................. | 455/436 |
| 2010/0197306 A1* | 8/2010 | Lopes .......................... | 455/435.1 |
| 2011/0081897 A1* | 4/2011 | Beattie et al. ................. | 455/418 |
| 2011/0222416 A1* | 9/2011 | Damnjanovic et al. ....... | 370/252 |
| 2012/0320768 A1* | 12/2012 | Shaffer et al. ................ | 370/252 |

(Continued)

FOREIGN PATENT DOCUMENTS

| | | |
|---|---|---|
| WO | 99/14869 | 3/1999 |
| WO | 2011/034960 A1 | 3/2011 |

OTHER PUBLICATIONS

PCT International Search Report and Written Opinion for International Application No. PCT/EP2013/067039, dated Apr. 8, 2014 (15 pgs.).

(Continued)

*Primary Examiner* — Nathan Taylor
(74) *Attorney, Agent, or Firm* — Fish & Richardson P.C.

(57) ABSTRACT

Systems, methods, and apparatuses for coverage matching in heterogeneous wireless communication networks are provided. The base station may adjust its receiver sensitivity to match the uplink and downlink coverage. In some implementations, the base station may transmit parameters reflecting its receiver sensitivity capability to a control entity. The control entity determines the required receiver sensitivity for the base station and transmits the receiver sensitivity adjustment information to the base station. The base station may adjust its receiver sensitivity based on the receiver sensitivity adjustment information. In some implementations, the base station may exchange its receiver sensitivity information with other base stations and adjust its receiver sensitivity based on information received from other base stations. The base station or control entity may also inform the user equipment (UE) about the base station receiver sensitivity such that the UE may adjust their transmission powers based on the base station's receiver sensitivity.

26 Claims, 8 Drawing Sheets

(56) References Cited

U.S. PATENT DOCUMENTS

2013/0077586 A1* 3/2013 Damnjanovic et al. ....... 370/329
2013/0316714 A1* 11/2013 Beattie et al. ................. 455/439
2014/0295846 A1* 10/2014 Ashraf et al. ................. 455/436

OTHER PUBLICATIONS

Catt, "Proposal for Pico eNodeB receiver reference sensitivity level", 3GPP TSG-RAN WG4 #52 bis, R4-093987, Miyazaki, Japan, Oct. 12-16, 2009 (4 pgs).

R1-125312 "TP on Simulation Assumptions for Evaluation of HSPA Heterogeneous Networks", Huawei, RAN1#71, New Orleans, Nov. 2012.

3GPP TS 25.331 V11.0.0 (Dec. 2011) 3rd Generation Partnership Project; Technical Specification Group Radio Access Network; Radio Resource Control (RRC); Protocol specification (Release 11), Dec. 2011.

R1-125192 "Range Expansion in Multicarrier and Multiflow Deployments", Qualcomm Incorporated, RAN1#71, New Orleans, Nov. 2012.

R1-125136 "Macro NodeB muting for DL interference coordination", ZTE, RAN1#71, New Orleans, Nov. 2012.

3GPP TS 36.423 V10.4.0 (Dec. 2011) 3rd Generation Partnership Project; Technical Specification Group Radio Access Network; Evolved Universal Terrestrial Radio Access Network (E-UTRAN); X2 application protocol (X2AP) (Release 10), Dec. 2011.

R4-080409 "Home NodeB Interference Analysis", Qualcomm Europe, Sorrento, Feb. 2008.

3GPP TR 25.967 V9.0.0 (May 2009) 3rd Generation Partnership Project; Technical Specification Group Radio Access Networks; Home Node B Radio Frequency (RF) Requirements (FDD) (Release 9), May 2009.

3GPP TS 25.215 V11.0.0 (Dec. 2011) 3rd Generation Partnership Project; Technical Specification Group Radio Access Network; Physical layer; Measurements (FDD) (Release 11), Dec. 2011.

* cited by examiner

METHODS AND SYSTEMS FOR WIRELESS COMMUNICATION IN HETEROGENEOUS NETWORKS

TECHNICAL FIELD

The present disclosure generally relates to heterogeneous wireless communication networks, and more particularly, to systems and methods for coverage matching in heterogeneous wireless communication networks.

BACKGROUND

In a UMTS Terrestrial Radio Access Network (UTRAN) or an Evolved Universal Terrestrial Radio Access Network (E-UTRAN), cells of different coverage sizes are deployed to improve cell coverage or to offload traffic. In a UTRAN or E-UTRAN network, small cells (e.g., pico cells, relay cells, or femto cells) are deployed with overlaid large cells (e.g., macro cells). A network including large cells and small cells is referred to as a heterogeneous wireless communication network or, for simplicity, as a heterogeneous network.

Macro cells and small cells may operate in the same carrier frequency or different carrier frequencies. For example, in a heterogeneous network consisting of macro cells and pico cells, the macro cells may operate on one carrier frequency while the pico cells may operate on another carrier frequency. Operating the macro cells and pico cells on different carrier frequencies helps to reduce the interference among cells. A user equipment (UE) in the heterogeneous network may move in a large geographical area which may result in changing of the UE's serving cell and the cell type (e.g., macro cell, pico cell, relay cell, femto cell) of the UE's serving cell.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

Figure 1:
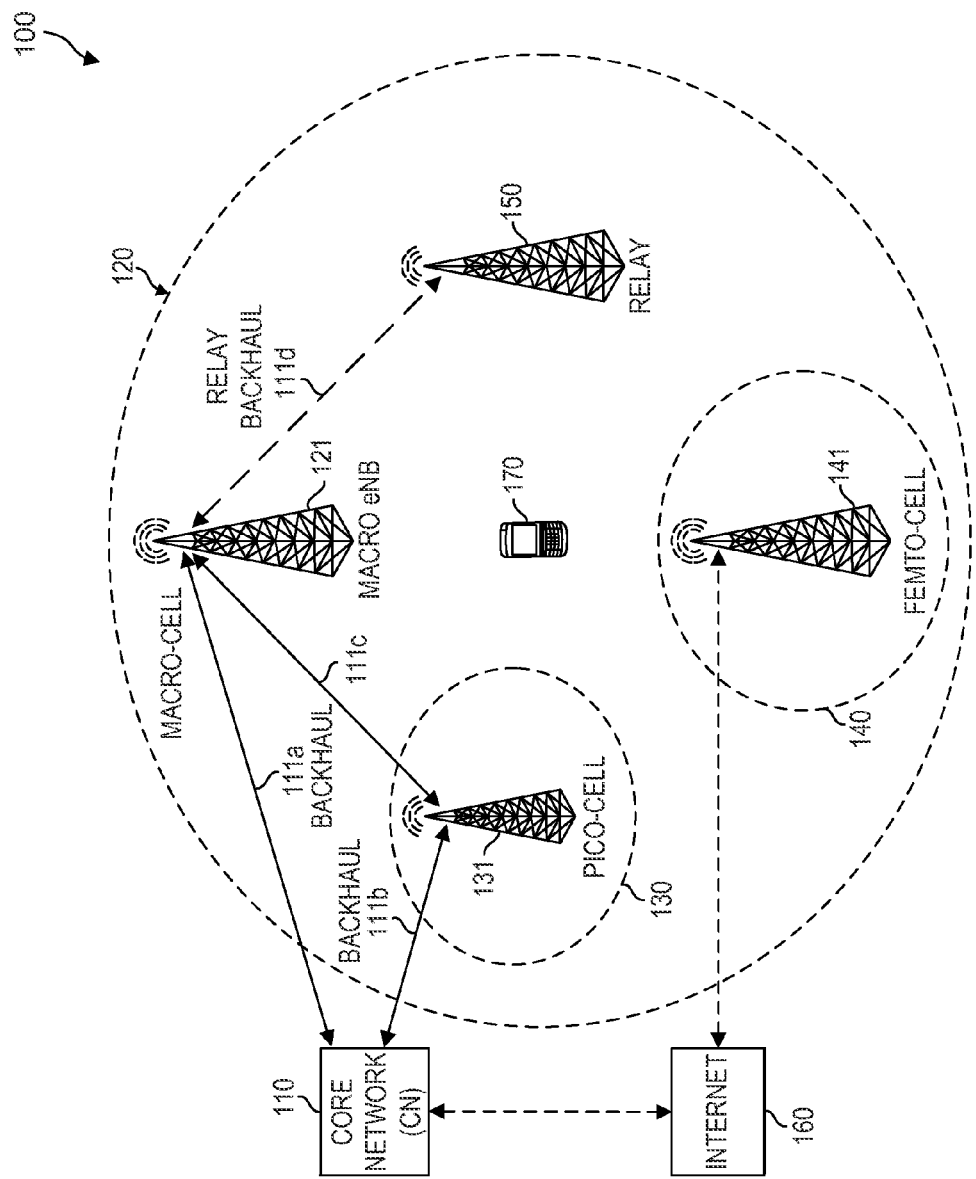
FIG. 1 illustrates an example E-UTRAN heterogeneous wireless communication network for implementing methods and systems consistent with the present disclosure.

The present disclosure relates to systems, methods, and apparatuses for coverage matching in heterogeneous wireless communication networks. In a typical heterogeneous cellular deployment, low-power cells, such as, pico cells, femto cells, relay nodes, are deployed as an underlay to existing macro cells. This underlay deployment is intended to help meet the demand for ever-increasing mobile data applications and/or coverage. Because of varied maximum transmit powers of the base stations in a heterogeneous network deployment, downlink (DL) coverage of the macro cells and low-power cells are different. On the other hand, the UE has one maximum transmit power setting towards the different types of base stations, and thus, the uplink (UL) coverage of the macro cells and low-power cells are the same, regardless of the different maximum transmit powers of the base stations. This leads to the problem of UL/DL coverage imbalance, namely that the downlink and uplink coverage boundaries do not coincide. As a result, the UL coverage of a UE could be matched to the DL coverage of a remote serving cell rather than a neighboring cell, which would cause significant interference among the cells. Moreover, the UL/DL coverage imbalance may also result in handover failures in situations where the UE is handing over from the low power cell to the macro cell due to the low uplink reception quality at the macro cell. The term "UL/DL coverage imbalance" can be interchangeably used with the term "UL/DL coverage mismatch".

To address the UL/DL coverage imbalance in heterogeneous wireless communication networks, in some implementations, the base station (BS) may adjust its receiver sensitivity or noise figure to better match its UL coverage with the DL coverage. In some implementations consistent with this disclosure, the amount of receiver sensitivity adjustment can be determined by a control entity outside the BS and signaled to the BS via a control interface. The control entity may collect information from a plurality of base stations and determine the appropriate receiver sensitivity setting for each base station. In some implementations, the base stations may exchange the relevant parameters via a direct BS-BS interface, and determine the required amount of receiver sensitivity adjustment by itself without involving the control entity. In some implementations, the amount of receiver sensitivity adjustment can be determined by the base station in the absence of receiving receiver sensitivity information from the control entity or other base stations. After adjusting the receiver sensitivity, the base station may inform the control entity or other base stations about this adjustment. Further, the control entity or base station may inform the UE about this adjustment. The UE may in turn adjust its uplink transmission power towards the base station accordingly, which leads to a matched UL/DL coverage for the UE in the heterogeneous network.

Reference will now be made in detail to the example embodiments implemented according to the disclosure; the examples are illustrated in the accompanying drawings. Wherever possible, the same reference numbers will be used throughout the drawings to refer to the same or like parts.

FIG. 1 illustrates an example E-UTRAN heterogeneous wireless communication network 100 in which systems and methods consistent with this disclosure may be implemented. The term "heterogeneous wireless communication network" or "heterogeneous network" may also be referred to as a "HetNet." The illustrated HetNet 100 includes a core network 110 and a macro cell or overlay cell 120. The term "cell" or "wireless cell" generally refers to an area of coverage of wireless transmission by a network or network component, such as an access node. The core network 110 is, in some implementations, connected to a data network such as Internet 160.

In the illustrated implementation, macro cell 120 includes at least one base station. The term "base station" (BS) can be interchangeably used with a cell, a network node, an access node, or a network component. Two or more base stations may operate on the same radio frequency or on different radio frequencies. The base station is, in some implementations, an overlay access node 121, which is connected to the core network 110 via a backhaul link 111a, including optical fiber or cable. The backhaul link between the macro eNB and the core network is referred to as an S1 interface. The term "overlay access node" generally refers to a network element or component that at least partly serves to form a wireless cell. In one implementation in which the network 100 is a long term evolution (LTE) network, the overlay access node 121 can be a Universal Terrestrial Radio Access Network (UTRAN) node B or "eNB" which is part of an evolved Universal Terrestrial Radio Access Network (E-UTRAN). An eNB that forms an overlay access node of a macro cell can be generally referred to as a "macro eNB." The term "eNB" may be interchangeably used with an "evolved node B." The eNBs may cooperate to conduct a mobility procedure for User Equipment (UE) in the network 100.

The network 100 also includes, in some implementations, one or more underlay cells, for example, a pico cell 130 and a femto cell 140. In some implementations, the underlay cells have a coverage at least partially overlapping with the coverage of the macro cell 120. While the term "underlay cell" is described herein in the context of LTE, the implementations described herein can be adapted for other wireless standards that have components similar to underlay cells, such as cellular telecommunication systems such as Global System for Mobile Communication (GSM) protocols, Universal Mobile Telecommunications System (UMTS), IEEE 802.11 Wireless Local Area Network (WLAN), and IEEE 802.16 WiMAX, which may also include small cells such as pico/femto cells.

Although FIG. 1 illustrates one pico cell and one femto cell, the network 100 can include more or less of such cell type. The underlay cells 130, 140 have a smaller coverage than the overlay cell 120. For example, in a suburban environment, the overlay cell 120 may have a coverage radius of 0.5 kilometer, while the underlay cells 130, 140 may have a coverage radius of 0.2 kilometer.

Access nodes 131, 141 forming the underlay cells 130, 140 use a lower transmission power than that of the overlay access node 121. The underlay cells 130, 140 may further include a range expansion area used for increasing the coverage area for the cells having a smaller coverage.

The pico cell 130, for example, includes a pico eNB 131 connected to the core network (CN) 110 via a backhaul link 111b and to the macro eNB 121 via a backhaul link 111c. The backhaul link between the macro eNB and the pico eNB is referred to as an X2 interface. The backhaul links 111b and 111c include, for example, cable, fiber, and wireless links. In some implementations, the pico eNB 131 can have a transmission power that is, for example, about 30 dBm, which is about 13 to 16 dB lower than the transmission power of the macro eNB 121, which may be about 43 to 46 dBm.

The femto cell 140, for example, includes a femto eNB 141 connected to the core network 110 via the Internet 160 via a wired or wireless connection. The femto cell 140 is a subscription based cell and can be referred to as a closed subscription group (CSG) cell. The term "closed subscription group (CSG)" can be interchangeably used with closed subscriber group. The term "femto eNB" can also be referred to as a "home eNB (HeNB)." In such instances, the macro eNB 121 can be referred to as a source eNB. In some implementations, the femto eNB 141 can have a transmission power that is, for example, about 20 dBm, which is about 23 to 26 dB lower than that of the macro eNB 121.

The network 100 also includes, in some implementations, a relay node 150 that, for example, serves to wirelessly relay data and/or control information between the macro eNB 121 and user equipment 170. The macro eNB 121 and the relay node 150 are connected to each other via a wireless backhaul link 111d. In such an instance, the macro eNB 121 is referred to as a donor eNB. In some implementations, the relay node 150 has a transmission power that is, for example, about 30 or 37 dBm, which is about 13 dB or 6 dB lower than that of the macro eNB 121. The term "underlay access node" may sometimes be used in this disclosure to refer to pico eNBs, femto eNBs, or relay nodes.

The CN 110 can be a backbone network, which may be a central part of the telecommunications system. In certain implementations, evolved packet core (EPC) serves as a main component of the CN 110. The CN 110 can include a mobility management entity (MME), a serving gateway (SGW), and a packet data network gateway (PGW). The MME is a main control element in the CN 110, and it is responsible for the functionalities comprising the control plane functions related to subscriber and session management. The SGW serves as a local mobility anchor such that the packets are routed through this point for intra EUTRAN mobility and mobility with other legacy 2G/3G systems. The SGW functions may include the user plane tunnel management and switching. The PGW provides connectivity to a services domain comprising external networks, such as IP networks.

The UE 170 communicates wirelessly with the overlay access node 121 or the underlay access nodes 131, 141, 150, depending on the location or the existence of subscription in the case of the femto cell 140. The term "user equipment," alternatively "UE," refers to various devices with telecommunications capabilities, such as mobile devices and network appliances. The UE may maintain connections with both an overlay access node and an underlay access node and communicate with them simultaneously. For example, the overlay access node may serve the control plane traffic for the UE, and the underlay access node may serve the data plane traffic for the UE.

Examples of user equipment include, but are not limited to, a mobile phone, a smart phone, a telephone, a television, a remote controller, a set-top box, a computer monitor, a computer (including a tablet computer such as BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game device, etc. The UE 170 includes a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 170 includes the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 2:
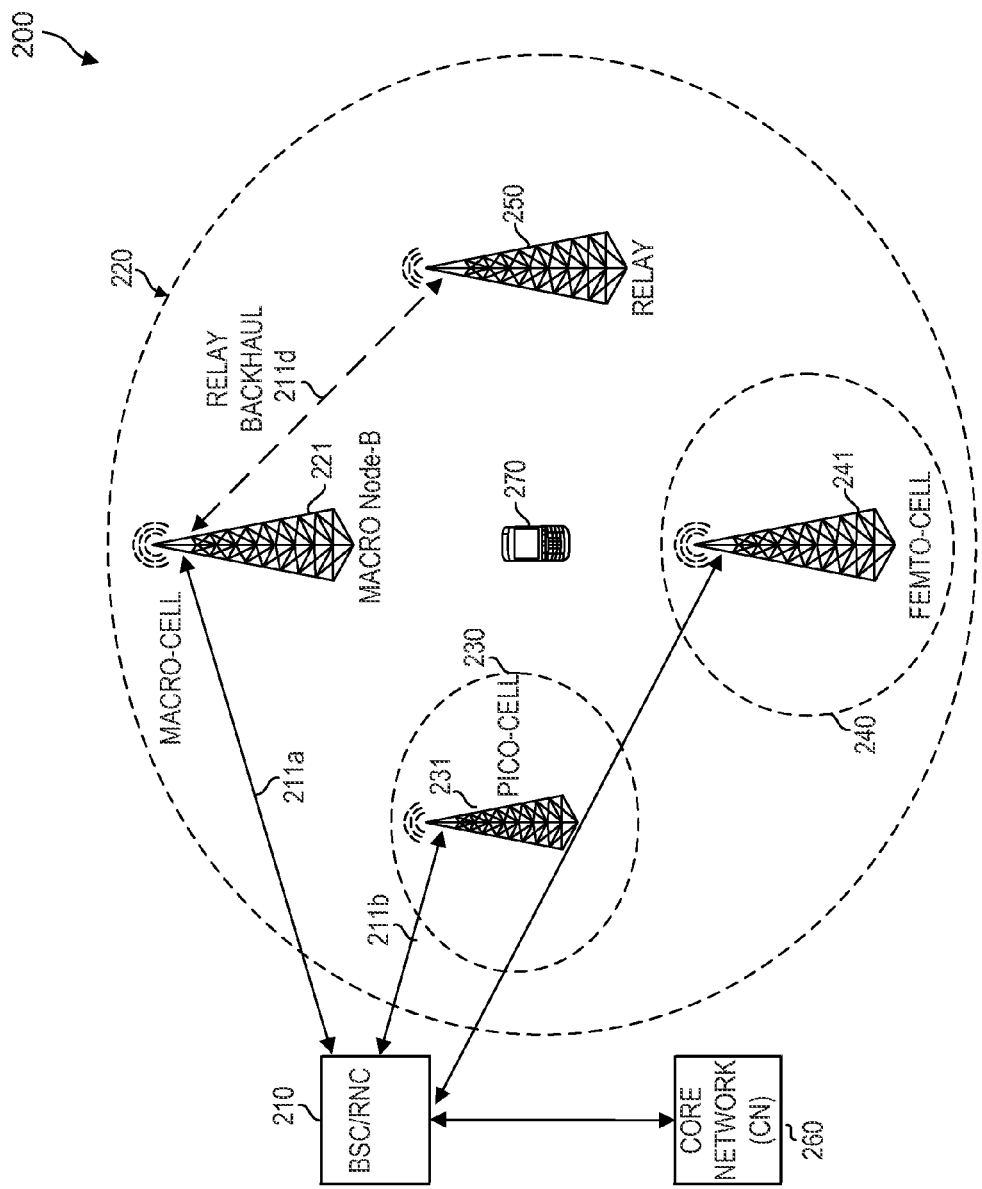
FIG. 2 illustrates an example UTRAN heterogeneous wireless communication network for implementing methods and systems consistent with the present disclosure.

FIG. 2 illustrates an example UTRAN heterogeneous wireless communication network 200 for implementing methods and systems consistent with the present disclosure. The illustrated HetNet 200 includes a macro Node-B 221, a relay node 250, a pico Node-B 231, a femto Node-B 241, a base station controller (BSC) 210, a core network 260, and a UE 270.

The network 200 includes one or more underlay cells, for example, a pico cell 230 and a femto cell 240. In some implementations, the underlay cells have a coverage at least partially overlapping with the coverage of the macro cell 220. Access nodes 231, 241 forming the underlay cells 230, 240 use a lower transmission power than that of the overlay access node 221. The macro cell and underlay cells provide wireless services to one or more devices such as UE 270.

The BSC 210 is also referred to as a radio network controller (RNC). The RNC 210 can control the Node-B base stations 221, 231, and 241. The RNC is a control entity that carries out radio resource management, some of the mobility management functions, and is the point where encryption is done before user data is sent to and from the UE 270. The RNC 210 and the Node-B base stations such as 221, 231, 241 form a radio access network. The interface between a Node-B and an RNC, such as 211a, 211b, is referred to as an "Iub" interface. The RNC 210 connects to the core network 260, which provides connectivity to an external network such as the Internet. Similar to the E-UTRAN heterogeneous network, the UTRAN heterogeneous network may include a relay node 250, which is connected to the macro Node-B 21 via a wireless backhaul link 211d. The femto Node-B 241 may be connected to the core network or the Home Node-B Gateway (HNB GW) via a wired or wireless connection. The femto cell 240 may be a subscription based cell and can be referred to as a closed subscription group (CSG) cell.

Figure 3:
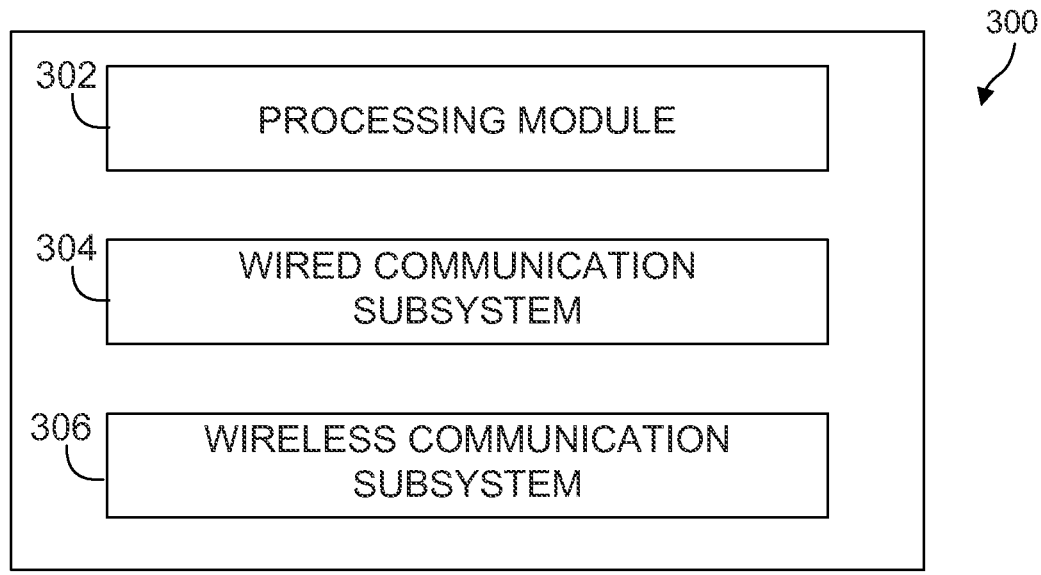
FIG. 3 illustrates an example access node device, in accordance with an embodiment of the present disclosure.

FIG. 3 illustrates an example access node device 300 consistent with certain aspects of this disclosure. The example access node device 300 includes a processing module 302, a wired communication subsystem 304, and a wireless communication subsystem 306. The processing module 302 includes one or more processing components (alternatively referred to as "processors" or "central processing units" (CPUs)) operable to execute instructions related to one or more of the processes, steps, or actions described in connection with one or more of the embodiments disclosed herein. The processing module 302 also includes other auxiliary components, such as random access memory (RAM), read only memory (ROM), secondary storage (for example, a hard disk drive or flash memory). Additionally, the processing module 302 executes certain instructions and commands to provide wireless or wired communication, using the wired communication subsystem 304 or a wireless communication subsystem 306. One skilled in the art will readily appreciate that various other components can also be included in the example access node device 300.

Figure 4:
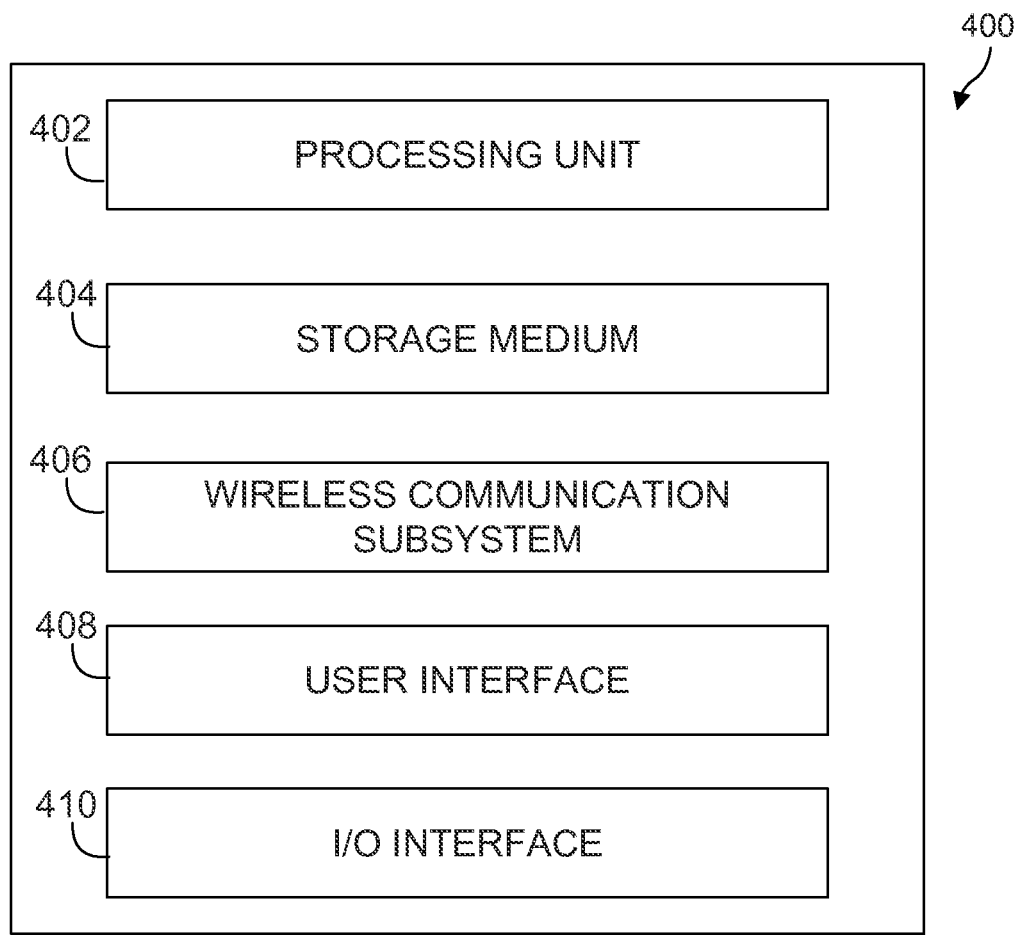
FIG. 4 illustrates an example user equipment device, in accordance with an embodiment of the present disclosure.

FIG. 4 illustrates an example user equipment device 400 consistent with certain aspects of the present disclosure. The example user equipment device 400 includes a processing unit 402, a computer readable storage medium 404 (for example, ROM or flash memory), a wireless communication subsystem 406, a user interface 408, and an I/O interface 410.

The processing unit 402 includes components and performs functions similar to the processing module 402 described with regard to FIG. 3. The wireless communication subsystem 406 is configured to provide wireless communications for data information or control information provided by the processing unit 402. The wireless communication subsystem 406 includes, for example, one or more antennas, a receiver, a transmitter, a local oscillator, a mixer, and a digital signal processing (DSP) unit. In some implementations, the wireless communication subsystem 406 can support MIMO transmissions.

The user interface 408 includes, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 410 includes, for example, a universal serial bus (USB) interface. One skilled in the art will readily appreciate that various other components can also be included in the example UE device 400.

Figure 5:
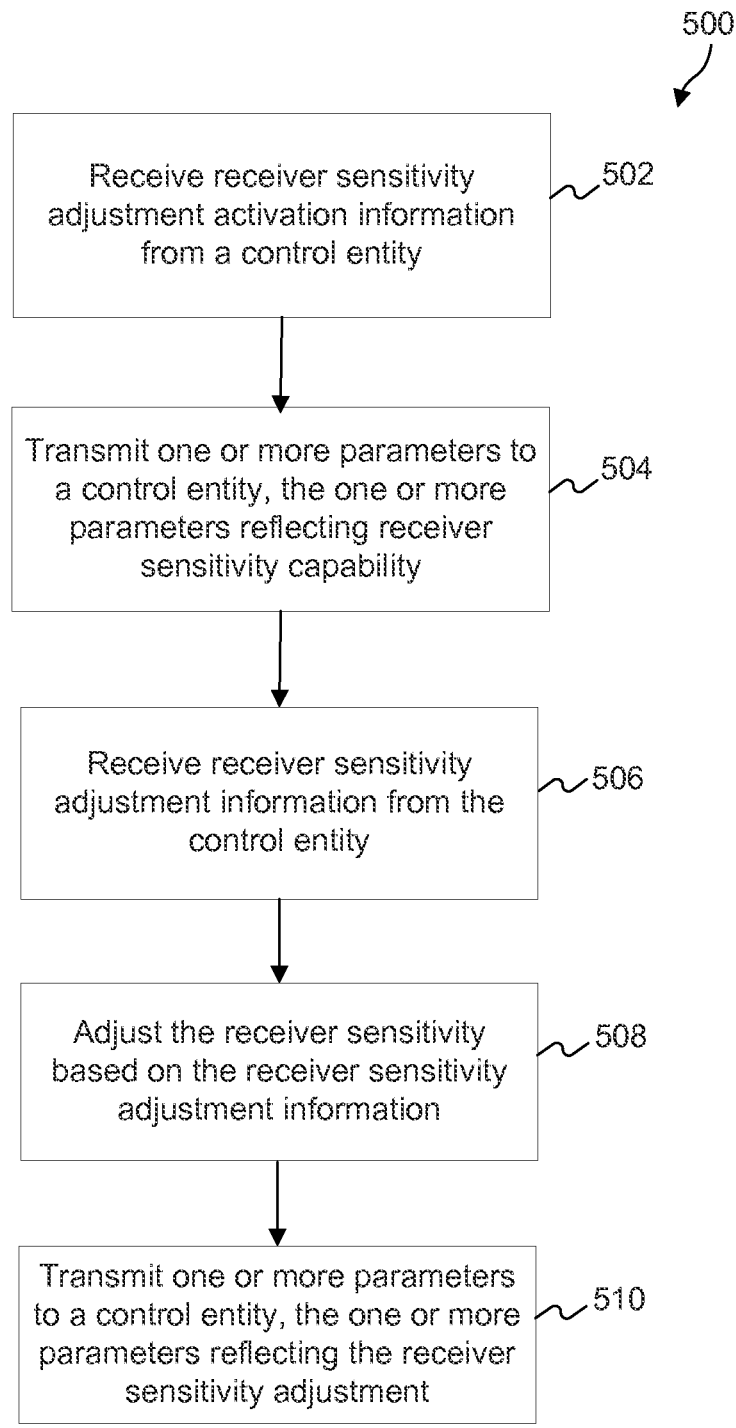
FIG. 5 illustrates a flow diagram of an example method performed by a base station for coverage matching, in accordance with an embodiment of the present disclosure.

FIG. 5 illustrates a flow diagram of an example method 500 performed by a base station for coverage matching, in accordance with an embodiment of the present disclosure. The uplink and downlink coverage mismatching can be addressed by adjusting the receiver sensitivity of the base station. Sensitivity is a parameter that describes the ability to receive weak signals. For example, a UTRAN macro node (MN) may be able to correctly receive a low rate message at a power level of approximate $N_{RX,MN}=-125$ dBm. By degrading the low power node (LPN) uplink receiver sensitivity, the uplink coverage of the LPN is reduced and matched to its downlink coverage. The term LPN generally refers to network nodes that serve micro, pico, femto or home cells. In this example method, the base station transmits its receiver sensitivity information to a centralized control entity, e.g., the RNC 210, which controls the receiver sensitivity adjustment for a plurality of base station. In some implementations, the described method 500 may also be performed between the base station and the operations and maintenance (OAM) entity via the configuration and management interface.

At 502, the base station may receive receiver sensitivity adjustment activation information from a control entity. The base station may activate or deactivate the receiver sensitivity adjustment based on the receiver sensitivity adjustment activation information. In some implementations, the base station may activate or deactivate the receiver sensitivity adjustment functionality on its own, in the absence of receiving the receiver sensitivity adjustment activation information.

At 504, the base station transmits one or more parameters to the control entity. The one or more parameters reflect the base station's receiver sensitivity capability. For example, the parameters may include the base station's receiver sensitivity adjustment capability, the minimum receiver sensitivity setting that the base station is capable of, the maximum receiver sensitivity setting that the base station is capable of, the current receiver sensitivity setting of the base station, the number of receive antennas of the base station, the receiver diversity gain of the base station, the receiver class of the base station, the maximum transmit power capability of the base station, etc. In some implementations, the control entity, for example, the RNC, may configure the base station to activate the receiver sensitivity adjustment feature and poll the base station for the related information of the base station.

In some implementations, the base station may set a target UL/DL coverage mismatch value and transmit this value to the control entity. In some other implementations, a target UL/DL coverage mismatch value is selected by the manufacturer, operator, network architect or network management software and set accordingly in the control entity. For example, the target mismatch value may be set to 0 dB as a default value, which represents a complete removal of the UL/DL coverage mismatch. Instead of completely removing the UL/DL coverage mismatch, a non-zero value of the UL/DL coverage mismatch may be preferred to control the UL interference. In some implementations, it may be beneficial for the residual imbalance level to increase as the original imbalance level increases. For example, if the original imbalance is equal to 20 dB then the target imbalance can be set to 6 dB; if the original imbalance is equal to 10 dB then the target imbalance can be set to 3 dB.

After receiving the information from the base station, the control entity determines the appropriate receiver sensitivity level or sensitivity adjustment for the base station. The control entity may receive information with regard to receiver sensitivity capability from a plurality of base stations to determine the appropriate receiver sensitivity for each base station. For example, the receiver sensitivity adjustment $\delta N_{RX,i}$ for the ith BS may be set as follows:

$$I_{or,max} = \max_i \{I_{or,i}\},$$

$$\delta N_{RX,i} = \max(I_{or,max} - I_{or,i} - M_{UD,T,i}, 0).$$

where the index i enumerates the base stations, $I_{or,i}$ represents the maximum transmit power for base station i, and $M_{UD,T,i}$ represents the target UL/DL mismatch value described above. The transmit power parameters $I_{or,i}$ and $I_{or,max}$ above are expressed in dBm, and $\delta N_{RX,i}$ and $M_{UD,T,i}$ are expressed in dB. The control entity first determines the highest maximum transmit power $I_{or,max}$ over the set of maximum transmit powers of base stations. Next, the control entity determines the receiver sensitivity adjustment $\delta N_{RX,i}$ taking into account the difference between the highest maximum transmit power and the maximum transmit power of the base station, and the target UL/DL coverage mismatch value received from the base station.

The effect of the above mechanism can be explained as follows. Assume for simplicity that $M_{UD,T,i}=0$ dB. If the ith base station is affected by positive UL/DL imbalance equal to ($I_{or,max}-I_{or,i}$), then the imbalance will be compensated by the positive sensitivity adjustment $\delta N_{RX,i}$ at that base station. In other words, the base station will be de-sensitized by $\delta N_{RX,i}$. The sensitivity adjustment is clipped at 0 dB, i.e. it is not possible in the example to improve receiver sensitivity. However, this is not precluded in some implementations, for example if the receiver had already been de-sensed or sensitivity is being maintained at a level higher than the lowest achievable value, it is possible to make the receiver more sensitive. Further, by introducing the parameter $M_{UD,T,i}$ it is possible to control the level of imbalance to a non-zero dB level.

In some implementations, to improve the precision of UL/DL coverage balancing, the RX sensitivity adjustment $\delta N_{RX,i}$ for the ith BS can be set based on an increased number of parameters. For example, the RX sensitivity adjustment $\delta N_{RX,i}$ for the ith BS may be set as follows:

$$S_i = I_{or,i} - G_{Div,i} + N_{RX,i} + RoT_i - G_{eq,i} + CIO_i,$$

$$S_{max} = \max_i \{S_i\},$$

$$\delta N_{RX,i} = \alpha_i \cdot \max(S_{max} - S_i - M_{UD,T,i}, 0),$$

where $G_{Div,i}$ represents receiver antenna diversity gain for the ith BS, $N_{RX,i}$ represents the receiver noise figure or receiver sensitivity for the ith BS, $RoT_i$ represents the rise-over-thermal value for the ith BS, $G_{eq,i}$ captures the potentially different equalizer implementation for each node or the generic receiver capability, and $CIO_i$ is the Cell Individual Offset parameter specified in UTRA specification 3GPP TS 25.331 "Radio Resource Control (RRC) Protocol Specification." The values are expressed on the logarithmic scale, i.e., in dB or dBm. In some implementations, the RoT may be replaced by the received signal power, received signal power target or related parameter, such as Received Total Wideband Power (RTWP) and Maximum Target Received Total Wideband Power (MTRTWP). The parameter $\alpha_i$ is a real number ranging from 0 to 1.

In this example, receiver sensitivity adjustment is used to compensate for the cumulative effect of imbalance due to base station transmit power, diversity gain, receiver sensitivity, UL cell load and equalizer gain. Further, using the coefficient $\alpha_i$, ranging from 0 to 1, allows for gradual rather than step-wise imbalance reduction, which is beneficial for network stability.

At 506, the base station receives the receiver sensitivity adjustment information, for example, $\delta N_{RX,i}$, from the control entity. In some implementations, if the current absolute value of the noise figure or sensitivity $N_{RX,i}$ is known to the control entity, the updated absolute value of the receiver noise figure or sensitivity could be signaled from the control entity to the base station, instead of the relative increment value of receiver sensitivity. At 508, the base station adjusts its receiver sensitivity based on the receiver sensitivity adjustment information. The sensitivity adjustment can be realized in a BS in number of ways, for example, by an inclusion in the receiver of a controlled source of additive noise, an inclusion in the receiver of a controlled attenuator, or modifying the operation of the automatic gain control (AGC) module. This adjustment of the receiver sensitivity in turn would result in an improved matching of the uplink and downlink coverage.

At 510, the base station may transmit one or more parameters to the control entity, where the one or more parameters reflect the receiver sensitivity adjustment performed at the base station. The receiver sensitivity adjustment may be based on the receiver sensitivity adjustment information received from the control entity, receiver sensitivity information received from another base station, or may be done by the base station in the absence of receiving the receiver sensitivity information from the control entity or another base station, for example based on the experienced UL interference. The control entity may take further actions after receiving the parameters from the base station. For example, the control entity may signal to the UEs in the coverage area of the base station an update to the UL Open Loop Power Control (OLPC) parameters. Further, the control entity may transmit updated receiver sensitivity adjustment information to base stations located in the proximity of the base station.

Figure 6:
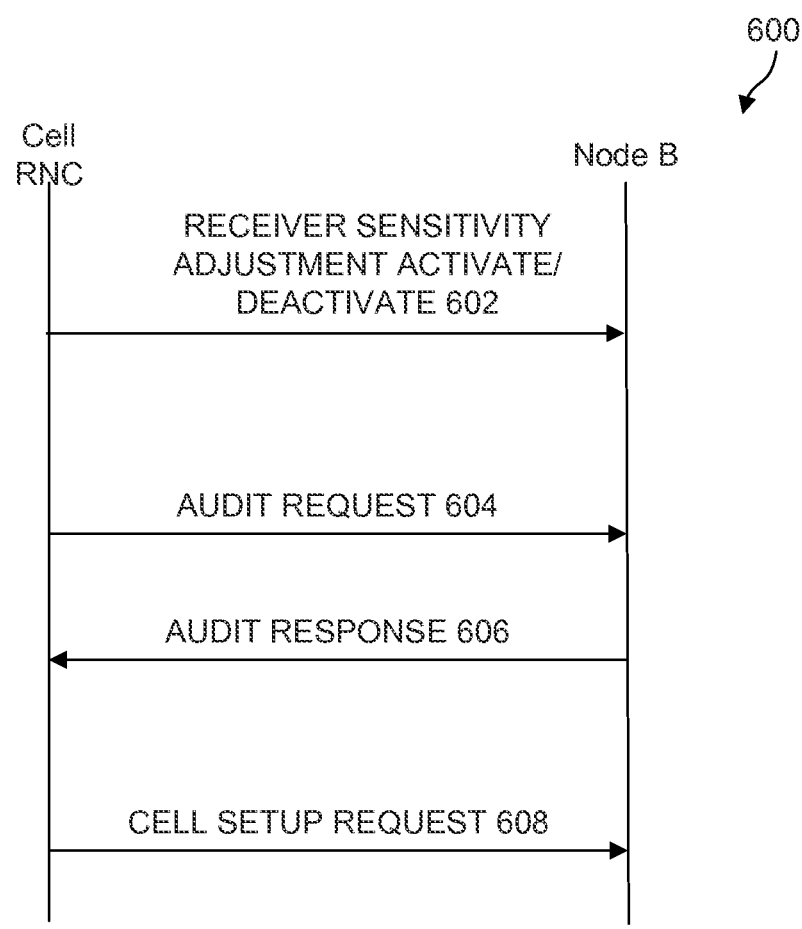
FIG. 6 illustrates an example signaling diagram for coverage matching, in accordance with an embodiment of the present disclosure.

FIG. 6 illustrates an example signaling diagram 600 for coverage matching, in accordance with an embodiment of the present disclosure. At 602, the control entity transmits receiver sensitivity adjustment activation/deactivation to the base station. Receiver sensitivity adjustment activation/deactivation includes permitting, enforcing or forbidding the base station to perform receiver sensitivity adjustment. The signaling of the receiver sensitivity adjustment activation/deactivation may be accomplished in a number of ways. For example, the control entity may transmit to the base station a RECEIVER_SENSITIVITY_ADJUSTMENT_ACTIVATE or a RECEIVER_SENSITIVITY_ADJUSTMENT_DEACTIVATE message. In a UTRAN network, the CELL_SETUP_REQEST or CELL_RECONFIGURATION_REQUEST messages could be updated to include the receiver sensitivity adjustment activation/deactivation information. In some implementations, in addition to the transmission of activation related parameters, the control entity may transmit to the base station the receiver sensitivity adjustment information in the receiver sensitivity adjust activation/deactivation message. The base station may activate or deactivate the receiver sensitivity adjustment based on the received activation/deactivation message from the control entity. In some implementations, the base station may activate or deactivate the receiver sensitivity adjustment functionality on its own, in the absence of receiving the receiver sensitivity adjustment activation/deactivate information.

At 604, the RNC sends a request message to the Node-B, for example, an Audit Request message, polling the base station for the relevant receiver sensitivity information. In some implementations, the RNC may poll the base station parameters as part of a Resource Status Indication procedure.

The Node-B parameters are signaled to the RNC at 606 in a message, for example, an Audit Response message. An example of updated AUDIT RESPONSE message contents, including the required parameters for the receiver sensitivity adjustment, is shown in Table 1. A detailed description of information elements in the AUDIT RESPONSE message can be found in 3GPP, TS 25.433, version 11.0.0, "Node B Application Protocol (NBAP)," which is incorporated herein by reference. The required parameters for the receiver sensitivity adjustment include, for example, receiver (RX) Sensitivity Adjustment Capability, Min RX Sensitivity Capability, Max RX Sensitivity Capability, RX Sensitivity, RX Diversity Gain, RX Class, etc.

TABLE 1

An example AUDIT RESPONSE message

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| End Of Audit Sequence Indicator | M | | 9.2.1.29A | | YES | ignore |
| Cell Information | | 0 ... <maxCellinNodeB> | | | EACH | ignore |
| >C-ID | M | | 9.2.1.9 | | — | |
| >Configuration Generation ID | M | | 9.2.1.16 | | — | |
| >Resource Operational State | M | | 9.2.1.52 | | — | |
| >Availability Status | M | | 9.2.1.2 | | — | |
| >Local Cell ID | M | | 9.2.1.38 | The local cell that the cell is configured on | — | |
| >Primary SCH Information | O | | Common Physical Channel Status Information 9.2.1.13A | Applicable to FDD only | YES | ignore |
| >Secondary SCH Information | O | | Common Physical Channel Status Information 9.2.1.13A | Applicable to FDD only | YES | ignore |
| >Primary CPICH Information | O | | Common Physical Channel Status Information 9.2.1.13A | Applicable to FDD only | YES | ignore |
| >Secondary CPICH Information | | 0 ... <maxSCPICHCell> | | Applicable to FDD only | EACH | ignore |
| >>Secondary CPICH Individual Information | M | | Common Physical Channel Status Information 9.2.1.13A | | — | |
| >Primary CCPCH Information | O | | Common Physical Channel Status Information 9.2.1.13A | | YES | ignore |
| >BCH Information | O | | Common Transport Channel Status Information 9.2.1.14B | | YES | ignore |

TABLE 1-continued

An example AUDIT RESPONSE message

| IE/Group Name | Presence | Range | IE Type and Reference | Semantics Description | Criticality | Assigned Criticality |
|---|---|---|---|---|---|---|
| >Secondary CCPCH Information | | 0 . . . <maxSCCPCHCell> | | See note 1 below | EACH | ignore |
| >>Secondary CCPCH Individual Information | M | | Common Physical Channel Status Information 9.2.1.13A | | — | |
| >PCH Information | O | | Common Transport Channel Status Information 9.2.1.14B | | YES | ignore |
| >PICH Information | O | | Common Physical Channel Status Information 9.2.1.13A | | YES | ignore |
| >FACH Information | | 0 . . . <maxFACHCell> | | | EACH | ignore |
| >>FACH Individual Information | M | | Common Transport Channel Status Information 9.2.1.14B | | — | |
| >PRACH Information | | 0 . . . <maxPRACHCell> | | | EACH | ignore |
| >>PRACH Individual Information | M | | Common Physical Channel Status Information 9.2.1.13A | | — | |
| >RACH Information | | 0 . . . <maxRACHCell> | | | EACH | ignore |
| >>RACH Individual Information | M | | Common Transport Channel Status Information 9.2.1.14B | | — | |
| >AICH Information | | 0 . . . <maxPRACHCell> | | Applicable to FDD only | EACH | ignore |
| >>AICH Individual Information | M | | Common Physical Channel Status Information 9.2.1.13A | | — | |
| >Not Used 1 | O | | NULL | This item shall not be used. Ignore if received. | — | |
| >Not Used 2 | O | | NULL | This item shall not be used. Ignore if received. | — | |
| >Not Used 3 | O | | NULL | This item shall not be used. Ignore if received. | — | |
| >Not Used 4 | O | | NULL | This item shall not be used. Ignore if received. | — | |
| >SCH Information | O | | Common Physical Channel Status Information 9.2.1.13A | TDD Sync Channel Applicable to 3.84 Mcps TDD only | YES | ignore |

TABLE 1-continued

An example AUDIT RESPONSE message

| IE/Group Name | Presence | Range | IE Type and Reference | Semantics Description | Criticality | Assigned Criticality |
|---|---|---|---|---|---|---|
| >FPACH Information | | 0... <maxFPACHCell> | | Applicable to 1.28 Mcps TDD only | EACH | ignore |
| >>FPACH Individual Information | M | | Common Physical Channel Status Information 9.2.1.13A | | — | |
| >DwPCH Information | O | | Common Physical Channel Status Information 9.2.1.13A | Applicable to 1.28 Mcps TDD only | YES | ignore |
| >HS-DSCH Resources Information | | 0... <maxFrequencyinCell> | | See note 2 below | EACH | ignore |
| >>Resource Operational State | M | | 9.2.1.52 | | — | |
| >>Availability Status | M | | 9.2.1.2 | | — | |
| >>UARFCN | O | | 9.2.1.65 | Corresponds to Nt (TS 25.105 [15]). Applicable to 1.28 Mcps TDD when using multiple frequencies. | YES | ignore |
| >MICH Information | O | | Common Physical Channel Status Information 9.2.1.13A | | YES | ignore |
| >E-DCH Resources Information | | 0... <maxFrequencyinCell> | | See note 2 below | EACH | ignore |
| >>Resource Operational State | M | | 9.2.1.52 | | — | |
| >>Availability Status | M | | 9.2.1.2 | | — | |
| >>UARFCN | O | | 9.2.1.65 | Corresponds to Nt (TS 25.105 [15]). Applicable to 1.28 Mcps TDD when using multiple frequencies. | YES | ignore |
| >PLCCH Information | | 0... <maxPLCCHCell> | | Applicable to 1.28 Mcps TDD only | EACH | ignore |
| >>PLCCH Individual Information | M | | Common Physical Channel Status Information 9.2.1.13A | | — | |
| >Primary CCPCH Information 7.68 Mcps | O | | Common Physical Channel Status Information 7.68 Mcps 9.2.3.36 | | YES | ignore |

TABLE 1-continued

An example AUDIT RESPONSE message

| IE/Group Name | Presence | Range | IE Type and Reference | Semantics Description | Criticality | Assigned Criticality |
|---|---|---|---|---|---|---|
| >Secondary CCPCH Information 7.68 Mcps | | 0 . . . <maxSCCPCHCell768> | | | EACH | ignore |
| >>Secondary CCPCH Individual Information 7.68 Mcps | M | | Common Physical Channel Status Information 7.68 Mcps 9.2.3.36 | | — | |
| >PICH Information 7.68 Mcps | O | | Common Physical Channel Status Information 7.68 Mcps 9.2.3.36 | | YES | ignore |
| >PRACH Information 7.68 Mcps | | 0 . . . <maxPRACHCell> | | | EACH | ignore |
| >>PRACH Individual Information 7.68 Mcps | M | | Common Physical Channel Status Information 7.68 Mcps 9.2.3.36 | | — | |
| >SCH Information 7.68 Mcps | O | | Common Physical Channel Status Information 7.68 Mcps 9.2.3.36 | TDD Sync Channel Applicable to 7.68 Mcps TDD only | YES | ignore |
| >MICH Information 7.68 Mcps | O | | Common Physical Channel Status Information 7.68 Mcps 9.2.3.36 | | YES | ignore |
| >E-RUCCH Information | | 0 . . . <maxE-RUCCHCell> | | 3.84 Mcps TDD only | EACH | ignore |
| >>E-RUCCH Individual Information | M | | Common Physical Channel Status Information 9.2.1.13A | | — | |
| >E-RUCCH Information 7.68 Mcps | | 0 . . . <maxE-RUCCHCell> | | 7.68 Mcps TDD only | EACH | ignore |
| >>E-RUCCH Individual Information 7.68 Mcps | M | | Common Physical Channel Status Information 7.68 Mcps 9.2.3.36 | | — | |
| >UARFCN Information LCR | | 0 . . . <maxFrequencyinCell> | | Applicable to 1.28 Mcps TDD when using multiple frequencies. | EACH | ignore |
| >>UARFCN | M | | 9.2.1.65 | Corresponds to Nt (TS 25.105 [15]). | — | |
| >>Resource Operational State | M | | 9.2.1.52 | | — | |
| >>Availability Status | M | | 9.2.1.2 | | — | |

TABLE 1-continued

An example AUDIT RESPONSE message

| IE/Group Name | Presence | Range | IE Type and Reference | Semantics Description | Criticality | Assigned Criticality |
|---|---|---|---|---|---|---|
| >UpPCH Information LCR | | 0 . . . <maxFrequencyinCell> | | Applicable to 1.28 Mcps TDD only | EACH | ignore |
| >>UARFCN | O | | 9.2.1.65 | Mandatory for 1.28 Mcps TDD when using multiple frequencies. Corresponds to Nt (TS 25.105 [15]). | — | |
| >>UpPCH Position LCR | M | | 9.2.3.4Q | | — | |
| >>Resource Operational State | M | | 9.2.1.52 | | — | |
| >>Availability Status | M | | 9.2.1.2 | | — | |
| Communication Control Port Information | | 0 . . . <maxCCPinNodeB> | | | EACH | ignore |
| >Communication Control Port ID | M | | 9.2.1.15 | | — | |
| >Resource Operational State | M | | 9.2.1.52 | | — | |
| >Availability Status | M | | 9.2.1.2 | | — | |
| Local Cell Information | | 0 . . . <maxLocalCellinNodeB> | | | EACH | ignore |
| >Local Cell ID | M | | 9.2.1.38 | | — | |
| >DL Or Global Capacity Credit | M | | 9.2.1.20B | | — | |
| >UL Capacity Credit | O | | 9.2.1.65A | | — | |
| >Common Channels Capacity Consumption Law | M | | 9.2.1.9A | | — | |
| >Dedicated Channels Capacity Consumption Law | M | | 9.2.1.20A | | — | |
| >Maximum DL Power Capability | O | | 9.2.1.39 | | — | |
| >Minimum Spreading Factor | O | | 9.2.1.47 | | — | |
| >Minimum DL Power Capability | O | | 9.2.1.46A | | — | |
| >Local Cell Group ID | O | | 9.2.1.37A | | — | |
| >Reference Clock Availability | O | | 9.2.3.14A | TDD only | YES | ignore |
| >Power Local Cell Group ID | O | | 9.2.1.49B | | YES | ignore |
| >HSDPA Capability | O | | 9.2.1.31Ga | | YES | ignore |
| >E-DCH Capability | O | | 9.2.1.70 | | YES | ignore |
| >E-DCH TTI2ms Capability | C-EDCHCapability | | 9.2.2.13V | FDD only | YES | ignore |
| >E-DCH SF Capability | C-EDCHCapability | | 9.2.2.13W | FDD only | YES | ignore |
| >E-DCH HARQ Combining Capability | C-EDCHCapability | | 9.2.2.13X | FDD only | YES | ignore |
| >E-DCH Capacity Consumption Law | O | | 9.2.2.13Ja | FDD only | YES | ignore |
| >F-DPCH Capability | O | | 9.2.2.16a | FDD only | YES | ignore |
| >E-DCH TDD Capacity Consumption Law | O | | 9.2.3.60 | TDD only | YES | ignore |
| >Continuous Packet Connectivity DTX-DRX Capability | O | | 9.2.2.64 | FDD only | YES | ignore |
| >Max UE DTX Cycle | C-DTX-DRXCapability | | 9.2.2.95 | FDD only | YES | ignore |

TABLE 1-continued

An example AUDIT RESPONSE message

| IE/Group Name | Presence | Range | IE Type and Reference | Semantics Description | Criticality | Assigned Criticality |
|---|---|---|---|---|---|---|
| >Continuous Packet Connectivity HS-SCCH less Capability | O | | 9.2.2.65 | FDD only | YES | ignore |
| >MIMO Capability | O | | 9.2.1.118 | FDD and 1.28 Mcps TDD only | YES | ignore |
| >SixtyfourQAM DL Capability | O | | 9.2.1.110 | FDD and 1.28 Mcps TDD only | YES | ignore |
| >MBMS Capability | O | | 9.2.1.86 | | YES | ignore |
| >Enhanced FACH Capability | O | | 9.2.1.114 | FDD and 1.28 Mcps TDD only | YES | ignore |
| >Enhanced PCH Capability | C-EnhancedFACHCapability | | 9.2.1.115 | FDD and 1.28 Mcps TDD only | YES | ignore |
| >SixteenQAM UL Capability | O | | 9.2.2.88 | FDD only | YES | ignore |
| >HS-DSCH MAC-d PDU Size Capability | O | | 9.2.1.31IC | | YES | ignore |
| >MBSFN Only Mode Capability | O | | 9.2.3.71 | 1.28 Mcps TDD only | YES | ignore |
| >F-DPCH Slot Format Capability | O | | 9.2.2.94 | FDD only | YES | ignore |
| >E-DCH MAC-d PDU Size Capability | O | | 9.2.1.74A | | YES | ignore |
| >Common E-DCH Capability | O | | 9.2.2.101 | FDD only | YES | Ignore |
| >E-AI Capability | C-CommonEDCHCapability | | 9.2.2.102 | FDD only | YES | Ignore |
| >Enhanced UE DRX Capability | O | | 9.2.1.116 | FDD only | YES | ignore |
| >Enhanced UE DRX Capability LCR | O | | Enhanced UE DRX Capability 9.2.1.116 | 1.28 Mcps TDD only | YES | ignore |
| >E-DPCCH Power Boosting Capability | O | | 9.2.2.109 | | YES | ignore |
| >SixtyfourQAM DL and MIMO Combined Capability | O | | 9.2.1.121 | FDD and 1.28 Mcps TDD only only | YES | ignore |
| >Multi Cell Capability Info | O | | 9.2.2.113 | FDD only | YES | ignore |
| >Semi-Persistent scheduling Capability LCR | O | | 9.2.3.91 | 1.28 Mcps TDD only | YES | ignore |
| >Continuous Packet Connectivity DRX Capability LCR | O | | 9.2.3.92 | 1.28 Mcps TDD only | YES | ignore |
| >Common E-DCH HS-DPCCH Capability | C-CommonEDCHCapability | | 9.2.2.116 | FDD only | YES | Ignore |
| >MIMO Power Offset For S-CPICH Capability | O | | 9.2.2.118 | FDD only | YES | ignore |
| >TX Diversity on DL Control Channels by MIMO UE Capability | O | | 9.2.2.121 | FDD only | YES | ignore |
| >Single Stream MIMO Capability | O | | 9.2.2.122 | FDD only | YES | Ignore |
| >Dual Band Capability Info | O | | 9.2.2.125 | FDD only | YES | ignore |
| >Cell Portion Capability LCR | O | | 9.2.3.106 | 1.28 Mcps TDD only | YES | ignore |
| >Cell Capability Container | O | | 9.2.2.129 | FDD only | YES | ignore |
| >TSO Capability LCR | O | | 9.2.3.109 | 1.28 Mcps TDD only | YES | ignore |

TABLE 1-continued

An example AUDIT RESPONSE message

| IE/Group Name | Presence | Range | IE Type and Reference | Semantics Description | Criticality | Assigned Criticality |
|---|---|---|---|---|---|---|
| >Precoding Weight Set Restriction | O | | 9.2.2.143 | FDD only | YES | ignore |
| >Cell Capability Container TDD LCR | O | | 9.2.3.115 | 1.28 Mcps TDD only | YES | ignore |
| >MU-MIMO Capability Container | O | | 9.2.3.119 | 1.28 Mcps TDD only | YES | ignore |
| >Adaptive Special Burst Power Capability LCR | O | | 9.2.3.122 | 1.28 Mcps TDD only | YES | ignore |
| >RX Sensitivity Adjustment Capability | O | | | | YES | ignore |
| >Min RX Sensitivity Capability | O | | | | YES | ignore |
| >Max RX Sensitivity Capability | O | | | | YES | ignore |
| >RX Sensitivity | O | | | | YES | ignore |
| >RX Diversity Gain | O | | | | YES | ignore |
| >RX Class | O | | | | YES | ignore |
| Local Cell Group Information | | 0 ... <maxLocalCellinNodeB> | | | EACH | ignore |
| >Local Cell Group ID | M | | 9.2.1.37A | | — | |
| >DL Or Global Capacity Credit | M | | 9.2.1.20B | | — | |
| >UL Capacity Credit | O | | 9.2.1.65A | | — | |
| >Common Channels Capacity Consumption Law | M | | 9.2.1.9A | | — | |
| >Dedicated Channels Capacity Consumption Law | M | | 9.2.1.20A | | — | |
| >E-DCH Capacity Consumption Law | O | | 9.2.2.13Ja | FDD only | YES | ignore |
| >E-DCH TDD Capacity Consumption Law | O | | 9.2.3.60 | TDD only | YES | ignore |
| Criticality Diagnostics | O | | 9.2.1.17 | | YES | ignore |
| Power Local Cell Group Information | | 0 ... <maxLocalCellinNodeB> | | | EACH | ignore |
| >Power Local Cell Group ID | M | | 9.2.1.49B | | — | |
| >Maximum DL Power Capability | M | | 9.2.1.39 | | — | |

NOTE 1:
This information element is a simplified representation of the ASN.1. [TDD - Repetitions 1 to 8 and repetitions 9 to maxSCCPCHCell are represented by separate ASN.1 structures.] Furthermore, maxSCCPCHCell has different values in the ASN.1 for FDD and for each of the two TDD options.

NOTE 2:
For 1.28 Mcps TDD when using multiple frequencies, this information element for Repetition 1 and repetition 2 through maxFrequencyinCell are represented by respective ASN.1 structures with different criticalities.

The RX Sensitivity Adjustment Capability parameter informs the RNC whether or not the Node-B is capable of RX sensitivity adjustment. An example of the RX Sensitivity Adjustment Capability information element (IE) is illustrated in Table 2.

TABLE 2

An Example RX Sensitivity Adjustment Capability Information Element

| IE/Group Name | Presence | Range | IE Type and Reference | Semantics Description |
|---|---|---|---|---|
| RX Sensitivity Adjustment Capability | | | ENUMERATED (RXSensitivity Adjustment Capable, RXSensitivity AdjustmentNon-Capable) | |

The Min RX Sensitivity Capability parameter contains the minimum RX sensitivity setting that the Node-B is capable of. An example of the Min RX Sensitivity Capability IE is illustrated in Table 3.

TABLE 3

An Example Min RX Sensitivity Information Element

| IE/Group Name | Presence | Range | IE Type and Reference | Semantics Description |
|---|---|---|---|---|
| Min RX Sensitivity | | | INTEGER (0..500) | Unit: dBm Range: −150..−100 dBm Step: 0.1 dB |

The Max RX Sensitivity Capability parameter contains the maximum RX sensitivity setting that the Node-B is capable of. An example of the Max RX Sensitivity Capability IE is illustrated in Table 4.

TABLE 4

An Example Max RX Sensitivity Information Element

| IE/Group Name | Presence | Range | IE Type and Reference | Semantics Description |
|---|---|---|---|---|
| Max RX Sensitivity | | | INTEGER (0..500) | Unit: dBm Range: −150..−100 dBm Step: 0.1 dB |

The RX Sensitivity parameter contains the current RX sensitivity setting in the Node-B. An example of the RX Sensitivity IE is illustrated in Table 5.

TABLE 5

An Example RX Sensitivity Information Element

| IE/Group Name | Presence | Range | IE Type and Reference | Semantics Description |
|---|---|---|---|---|
| RX Sensitivity | | | INTEGER (0..500) | Unit: dBm Range: −150..−100 dBm Step: 0.1 dB |

The RX Diversity Gain parameter informs the control entity about the Node-B RX diversity gain. An example of the RX Diversity Gain IE is illustrated in Table 6, where the RX Diversity Gain IE is expressed in dB. This IE reflects the RX antenna solution of the base station. For example, a 0 dB gain may correspond to a single RX antenna; a 3 dB gain may correspond to two RX antennas and 6 dB gain may correspond to four RX antennas. In another example, the RX Diversity Gain IE may be signaled as the number RX antennas of the base station.

TABLE 6

An Example RX Diversity Gain Information Element

| IE/Group Name | Presence | Range | IE Type and Reference | Semantics Description |
|---|---|---|---|---|
| RX Diversity Gain | | | INTEGER (0..200) | Unit: dBm Range: 0..20 dB Step: 0.1 dB |

The RX Class parameter informs the control entity about the Node-B receiver class. An example of the RX Class IE is illustrated in Table 7. This IE reflects the implementation-dependent receiver performance. For example, the receiver could be designed according to a baseline rake receiver principle, an enhanced minimum mean square error principle or an enhanced interference cancellation principle.

TABLE 7

An Example RX Class Information Element

| IE/Group Name | Presence | Range | IE Type and Reference | Semantics Description |
|---|---|---|---|---|
| RX Class | | | ENUMERATED (RXClassBaseline, RXClassEnhanced1, RXClassEnhanced2, RXClassEnhanced3) | Corresponds to receiver that fulfills the corresponding performance requirements specified in 25.104. |

At 608, The Node-B receiver sensitivity adjustment is signaled by the RNC to the Node-B, for example, in a CELL SETUP REQUEST message, during the Cell Setup procedure or in a CELL_RECONFIGURATION_REQUEST message, during the Cell Reconfiguration procedure. Table 8 shows an example of the updated CELL SETUP REQUEST message including the RX sensitivity parameters. A detailed description of information elements in the CELL SETUP REQUEST message can be found in 3GPP, TS 25.433.

TABLE 8

An example CELL SETUP REQUEST message

| IE/Group Name | Presence | Range | IE Type and Reference | Semantics Description | Criticality | Assigned Criticality |
|---|---|---|---|---|---|---|
| Message Discriminator | M | | 9.2.1.45 | | — | |
| Message Type | M | | 9.2.1.46 | | YES | reject |
| Transaction ID | M | | 9.2.1.62 | | — | |
| Local Cell ID | M | | 9.2.1.38 | | YES | reject |
| C-ID | M | | 9.2.1.9 | | YES | reject |
| Configuration Generation ID | M | | 9.2.1.16 | | YES | reject |
| T Cell | M | | 9.2.49 | | YES | reject |
| UARFCN | M | | 9.2.1.65 | Corresponds to Nu (TS 25.104 [14]) | YES | reject |
| UARFCN | M | | 9.2.1.65 | Corresponds to Nd (TS 25.104 [14]) | YES | reject |
| Maximum Transmission Power | M | | 9.2.1.40 | | YES | reject |
| Closed Loop Timing Adjustment Mode | O | | 9.2.2.2A | | YES | reject |
| Primary Scrambling Code | M | | 9.2.2.34 | | YES | reject |
| Synchronisation Configuration | | 1 | | | YES | reject |
| >N_INSYNC_IND | M | | 9.2.1.47A | | — | |
| >N_OUTSYNC_IND | M | | 9.2.1.47B | | — | |
| >T_RLFAILURE | M | | 9.2.1.56A | | — | |
| DL TPC Pattern 01 Count | M | | 9.2.2.13A | | YES | reject |
| Primary SCH Information | | 1 | | | YES | reject |
| >Common Physical Channel ID | M | | 9.2.1.13 | | — | |
| >Primary SCH Power | M | | DL Power 9.2.1.21 | | — | |
| >TSTD Indicator | M | | 9.2.1.64 | | — | |
| Secondary SCH Information | | 1 | | | YES | reject |
| >Common Physical Channel ID | M | | 9.2.1.13 | | — | |
| >Secondary SCH Power | M | | DL Power 9.2.1.21 | | — | |
| >TSTD Indicator | M | | 9.2.1.64 | | — | |
| Primary CPICH Information | | 1 | | | YES | reject |
| >Common Physical Channel ID | M | | 9.2.1.13 | | — | |
| >Primary CPICH power | M | | 9.2.2.33 | | — | |
| >Transmit Diversity Indicator | M | | 9.2.2.53 | | — | |
| Secondary CPICH Information | | 0 . . . <maxSCPICHCell> | | | EACH | reject |
| >Common Physical Channel ID | M | | 9.2.1.13 | | — | |
| >DL Scrambling Code | M | | 9.2.2.13 | | — | |
| >FDD DL Channelisation Code Number | M | | 9.2.2.14 | | — | |
| >Secondary CPICH Power | M | | DL Power 9.2.1.21 | | — | |
| >Transmit Diversity Indicator | M | | 9.2.2.53 | | — | |
| Primary CCPCH Information | | 1 | | | YES | reject |
| >Common Physical Channel ID | M | | 9.2.1.13 | | — | |
| >BCH Information | | 1 | | | — | |
| >>Common Transport Channel ID | M | | 9.2.1.14 | | — | |
| >>BCH Power | M | | DL Power 9.2.1.21 | | — | |
| >STTD Indicator | M | | 9.2.2.48 | | — | |
| Limited Power Increase Information | | 1 | | | YES | reject |

TABLE 8-continued

An example CELL SETUP REQUEST message

| IE/Group Name | Presence | Range | IE Type and Reference | Semantics Description | Criticality | Assigned Criticality |
|---|---|---|---|---|---|---|
| >Power_Raise_Limit | M | | 9.2.2.29A | | — | |
| >DL_power_averaging_window_size | M | | 9.2.2.12A | | — | |
| IPDL Parameter Information | | 0 . . . 1 | | | YES | reject |
| >IPDL FDD Parameters | M | | 9.2.2.18C | | — | |
| >IPDL Indicator | M | | 9.2.1.36F | | — | |
| Cell Portion Information | | 0 . . . <maxNrOfCellPortionsPerCell> | | | EACH | reject |
| >Cell Portion ID | M | | 9.2.2.1Ca | | — | |
| >Associated Secondary CPICH | M | | Common Physical Channel ID 9.2.1.13 | | — | |
| >Maximum Transmission Power for Cell Portion | M | | Maximum Transmission Power 9.2.1.40 | | — | |
| MIMO Pilot Configuration | O | | 9.2.2.73 | | YES | reject |
| MIMO Pilot Configuration Extension | O | | 9.2.2.120 | Can only be present if the MIMO Pilot Configuration IE is present | YES | reject |
| MIMO with four transmit antennas Pilot Configuration | O | | 9.2.2.165 | | YES | reject |
| RX Sensitivity | O | | | | YES | reject |

In some implementations, one base station recommends the sensitivity adjustment to another base station over the BS-BS interface for adjusting the other base station's receiver sensitivity. For example, the macro node assumes the role of the control entity, determines the RX sensitivity adjustment for other BSs based on the their signaled parameters and its own parameters, and signals the determined sensitivity adjustment to the low power nodes.

Figure 7:
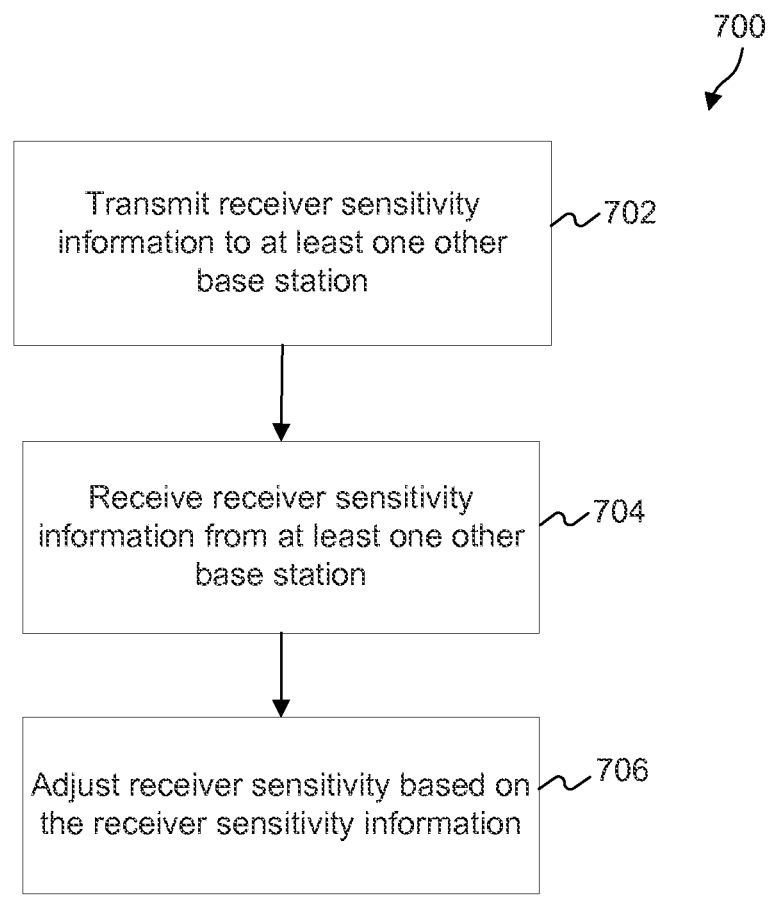
FIG. 7 illustrates a flow diagram of another example method performed by a base station for coverage matching, in accordance with an embodiment of the present disclosure.

FIG. 7 illustrates a flow diagram of another example method 700 performed by a base station for coverage matching, in accordance with an embodiment of the present disclosure. In this method, the coverage imbalance can be reduced or eliminated by base stations exchanging the receiver sensitivity information, along with other information, e.g. over a BS-BS interface.

At 702, the base station may transmit its receiver sensitivity information to one or more other base stations. The receiver sensitivity information may include its maximum transmit power and/or its current receiver sensitivity setting. At 704, the base station may receive receiver sensitivity information from one or more other base stations. Similarly, the received receiver sensitivity information may include the maximum transmit power and/or the current receiver sensitivity setting of the other base stations. At 706, the base station may adjust its receiver sensitivity based on the received receiver sensitivity information of the other base stations. For example, the base station may adjust its receiver sensitivity as follows:

$$S_i = I_{or,i} + N_{RX,i},$$

$$S_{max} = \max_i \{S_i\},$$

$$\delta N_{RX,0} = \alpha_0 \cdot \max(S_{max} - S_0 - M_{UD,T,0}, 0),$$

where the index i enumerates the signaling parameters received from other BSs by the 0th base station. The target UL/DL mismatch value of $M_{UD,T,0}$ is a network parameter and may be set to 0 dB by default. In some implementations, $M_{UD,T,0}$ is exchanged by the base stations over the BS-BS interface. In some implementations, $M_{UD,T,0}$ is recommended to the 0th base station by another base station over the BS-BS interface. In some other implementations, $M_{UD,T,0}$ is selected by the manufacturer, operator, network architect or network management software and set accordingly in base station, for example via the configuration and management interface. The parameter $\alpha_0$ is a real number ranging from 0 to 1. In the example, BS maximum TX power $I_{or,max}$ is signaled between base stations in addition to the receiver sensitivity.

The effect of the above mechanism can be explained as follows. Assume for simplicity that $M_{UD,T,0}$=0 dB and $\alpha_0$=1. If the $0^{th}$ base station is affected by positive UL/DL imbalance equal to ($S_{max}-S_0$), then the imbalance will be compensated by the positive sensitivity adjustment $\delta N_{RX,0}$. In other words, the base station will be de-sensitized by $\delta N_{RX,0}$. The sensitivity adjustment is clipped at 0 dB, i.e. it is not possible in the example to improve receiver sensitivity. However, this is not precluded in some implementations, for example if the receiver had already been de-sensed or sensitivity is being maintained at a level higher than the lowest achievable value, it is possible to make the receiver more sensitive. By introducing the parameter $M_{UD,T,0}$, it is possible to control the level of imbalance to a non-zero level. Further, using the coefficient $\alpha_0$, ranging from 0 to 1, allows for gradual rather than step-wise imbalance reduction, which is beneficial for network stability.

In some implementations, in addition to the parameters $I_{or,i}$ and $N_{RX,i}$, additional BS parameters may be signaled and taken into account in the calculation of $\delta N_{RX,0}$, for example, receiver diversity solution, UL load, UL load target, equalizer gain, etc.

In some implementations, for adjusting base station's receiver sensitivity, one base station may recommend the sensitivity adjustment to another base station's receiver over the BS-BS interface. For example, the macro node may assume the 'master BS' role, determine the RX sensitivity adjustment based on the signaled parameters from other base stations and its own parameters, and signal the determined sensitivity adjustment to the low power nodes.

Figure 8:
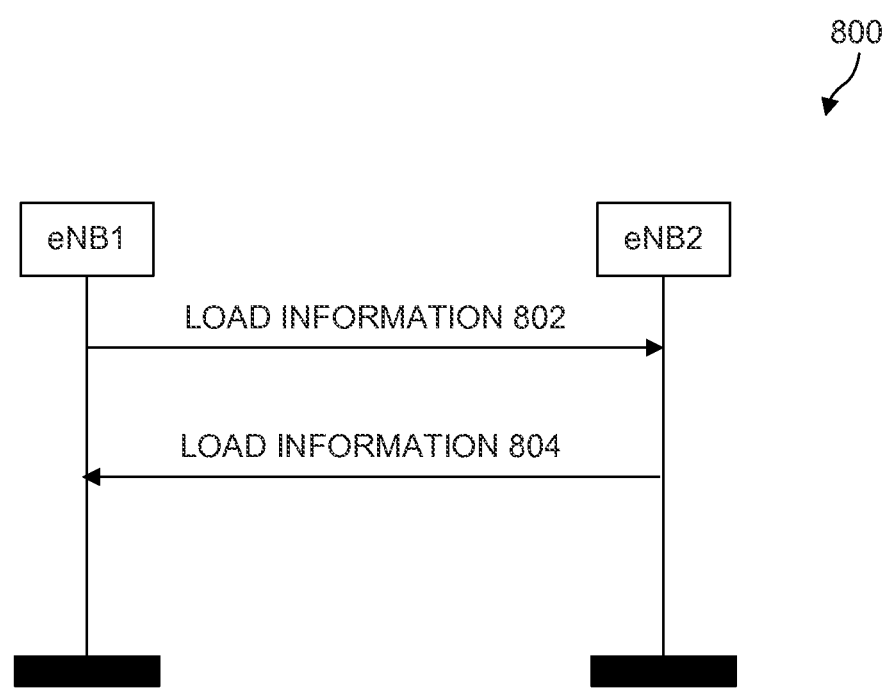
FIG. 8 illustrates another example signaling diagram for coverage matching, in accordance with an embodiment of the present disclosure.

FIG. 8 illustrates an example signaling diagram 800 for coverage matching, in accordance with an embodiment of the present disclosure. The X2 interface signaling between the base stations in an E-UTRAN network or the Iurh interface signaling between base stations in a UTRAN network may be used in this example. At 802, eNB1 transmits its receiver sensitivity information to eNB2, for example, in a LOAD INFORMATION message during the Load Indication procedure. At 804, eNB1 receives receiver sensitivity information of eNB2, for example, in a LOAD INFORMATION message during the Load Indication procedure.

The LOAD INFORMATION message includes parameters for receiver sensitivity of the eNBs, such as Max transmit (TX) Power, Min RX Sensitivity Capability, Max RX Sensitivity Capability, RX Sensitivity, RX Diversity Gain, RX Class, etc. An example of updated LOAD INFORMATION message is shown in Table 9. A detailed description of information elements in the LOAD INFORMATION message can be found in 3GPP, TS 36.423, version 11.0.0, "X2 Application Protocol (X2AP)," which is incorporated here by reference.

TABLE 10

Max TX Power Information Element

| IE/Group Name | Presence | Range | IE Type and Reference | Semantics Description |
|---|---|---|---|---|
| Max TX Power | | | INTEGER (0..500) | Unit: dBm Range: 0..50 dBm Step: 0.1 dB |

After the base station adjusts its receiver sensitivity for UL/DL coverage matching, the base station or the control entity may inform the UE about this adjustment such that the UE may adjust its uplink transmit power accordingly.

Figure 9:
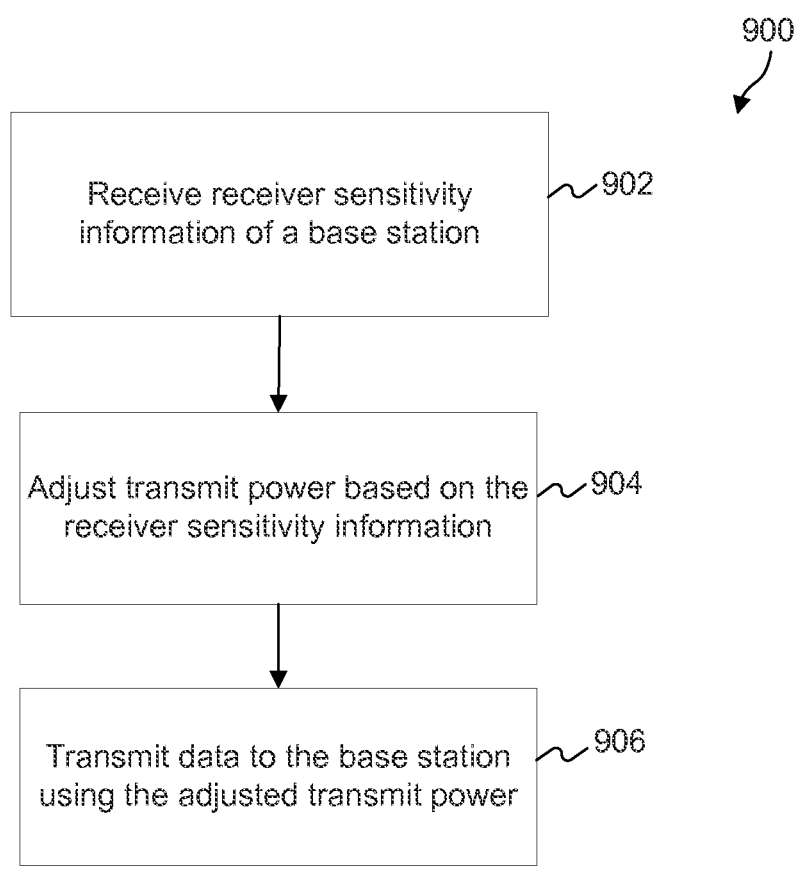
FIG. 9 illustrates a flow diagram of an example method performed by a user equipment for coverage matching, in accordance with an embodiment of the present disclosure.

FIG. 9 illustrates a flow diagram of an example method 900 performed by a user equipment for coverage matching, in accordance with an embodiment of the present disclosure. At 902, the UE receives receiver sensitivity information of a base station. The receiver sensitivity information may be received from a control entity, e.g., an RNC, or from a base station directly. The receiver sensitivity information may include a parameter derived from the receiver sensitivity adjustment value of the base station, or a parameter whose value was updated based on the receiver sensitivity adjustment value of the base station. The RX sensitivity adjustment value may be

TABLE 9

An example LOAD INFORMATION message

| IE/Group Name | Presence | Range | IE type and reference | Semantics description | Criticality | Assigned Criticality |
|---|---|---|---|---|---|---|
| Message Type | M | | 9.2.13 | | YES | ignore |
| Cell Information | M | | | | YES | ignore |
| >Cell Information Item | | 1 . . . <maxCellineNB> | | | EACH | ignore |
| >>Cell ID | M | | ECGI 9.2.14 | Id of the source cell | — | — |
| >>UL Interference Overload Indication | O | | 9.2.17 | | — | — |
| >>UL High Interference Information | | 0 . . . <maxCellineNB> | | | | |
| >>>Target Cell ID | M | | ECGI 9.2.14 | Id of the cell for which the HII is meant | — | — |
| >>>UL High Interference Indication | M | | 9.2.18 | | — | — |
| >>Relative Narrowband Tx Power (RNTP) | O | | 9.2.19 | | — | — |
| >>ABS Information | O | | 9.2.54 | | YES | ignore |
| >>Invoke Indication | O | | 9.2.55 | | YES | ignore |
| >>Max TX Power | O | | | | | |
| >>RX Sensitivity Adjustment Capability | O | | | | | |
| >>Min RX Sensitivity Capability | O | | | | | |
| >>Max RX Sensitivity Capability | O | | | | | |
| >>RX Sensitivity | O | | | | | |
| >>RX Diversity Gain | O | | | | | |
| >>RX Class | O | | | | | |

An example definition of the Max TX Power Information Element is shown in Table 10. Examples of the Min RX Sensitivity Capability, Max RX Sensitivity Capability, RX Sensitivity, RX Diversity Gain, and RX Class Information Elements are shown in Tables 2-7.

accompanied by an adjustment to the UL Open Loop Power Control (OLPC) parameters, such as 'Constant Value' and/or 'UL interference' signaled by the base station or RNC to the UEs. In OLPC, the UE determines its TX power based on the estimated pathloss between the UE and the BS, as well as other related parameters signaled from the network. In some implementations, 'Constant Value' can be set to 'Constant Value+$\delta N_{RX}$' by the base station or RNC. In some implementations, 'UL interference' can be set to 'UL interference+$\alpha \cdot \delta N_{rx}$+b' by the base station or RNC, where a and b are real constants. Setting the 'Constant Value' and 'UL interference' as described above may lead to an increase of the signaling range for these or similar parameters. For example, the signaling range of the 'Constant Value' may increase from [−35 dB, −10 dB] to [−35 dB, +15 dB]. The signaling range of the 'UL interference parameter' may increase from [−110 dB, −70 dB] to [−110 dB, −30 dB]. The increase of the signaling range may be achieved without changing the granularity of the signaled parameter or by coarser granularity of the signaled parameter. In some implementations, a pair of parameters may be signaled, for example 'Constant Value' and 'Constant Value 2', where the signaling range of the first parameter is unchanged while the signaling range of the second parameter is increased. Alternatively, an additional 'RX Sensitivity Value' parameter can be introduced and signaled to the UE by the base station or RNC. For example, the value of the additional parameter can be equal to $\delta N_{RX}$ or $\alpha \cdot \delta N_{rx}$+b, where a and b are real constants.

At 904, the UE adjusts its uplink transmit power in connection with the base station based on the receiver sensitivity information. For example, the UE may adjust its transmit power in OLPC as follows:

Preamble_Initial_Power=Primary CPICH TX power−CPICH_RSCP+UL interference+Constant Value+RX Sensitivity Value where (Primary CPICH TX power−CPICH_RSCP) is the DL pathloss estimate, the parameters 'Primary CPICH TX power', 'UL interference', 'Constant Value', and 'RX Sensitivity Value' are signaled by the network. In some implementations, the parameter 'RX Sensitivity Value' may be absent. In another example, the UE may adjust its transmit power in OLPC as follows:

Preamble_Initial_Power=Primary CPICH TX power−CPICH_RSCP+UL interference+Constant Value 2

At 906, the UE transmits data to the base station using the adjusted transmit power.

When BS RX sensitivity is changed, the network may signal to the UE updated parameter values for UL pathloss estimation. In some implementations, the network may signal to the UE additional parameters for UL pathloss estimation to inform the UE the change of the BS RX sensitivity. Where the RX sensitivity adjustment is determined by the control entity, the updated parameter values and/or additional parameters may be determined by the control entity and signaled by the control entity to the UE or multiple UEs. Where the RX sensitivity adjustment is determined by the base station, the updated parameter values and/or additional parameters may be determined by the BS and signaled by the BS to the UE or multiple UEs.

The systems and methods described above may be implemented by any hardware, software or a combination of hardware and software having the above described functions. The software code, either in its entirety or a part thereof, may be stored in a computer readable memory.

It should be understood that the described methods and signaling can be dependent on the operating frequency band and/or may be carrier-frequency specific. That is, different de-sensitizations may be applied, derived, negotiated or signaled for each of a plurality of supported frequency bands or carrier frequencies.

Further, it should be understood that, within a specific operating frequency band, the described methods and signaling can be specific to sub-bands of the carrier, for example in frequency division multiplexing or frequency division multiple access systems. That is, different de-sensitizations may be applied, derived, negotiated or signaled for each of a plurality of frequency sub-bands within a carrier bandwidth.

Further, it should be understood that the methods and signaling can be implemented in a part of the network, a subset of base stations, a sub-set of base-station types and/or a subset of control entities.

Further, it should be understood that the methods and signaling can be modified to include the signaling of receiver 'native' sensitivity, i.e., the lowest achievable sensitivity value, as well as the current receiver sensitivity or the sensitivity adjustment from the lowest achievable value. As an alternative to sensitivity, the receiver noise figure or similar parameter can be used in the signaling and calculations.

Further, it should be understood that the methods and signaling can be modified to include the 'native' base station parameters and capabilities, i.e., maximum TX power, receiver diversity solution, UL load, UL load target, equalizer gain, CIO, as well as the parameters and capabilities currently configured or measured.

Further, it should be understood that a configurable timer can be specified and/or signaled to the BS, defining a minimum time period between implementing updates to BS receiver sensitivity, for network stability reasons.

The example processes of FIGS. 5, 7, and 9 may be implemented using coded instructions (e.g., computer-readable instructions) stored on a tangible computer-readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of 500, 700, and 900 may be implemented using coded instructions (e.g., computer-readable instructions) stored on a non-transitory computer-readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals. Also, in the context of the current invention disclosure, as used herein, the terms "computer readable" and "machine readable" are considered technically equivalent unless indicated otherwise.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method of a base station, comprising:
transmitting one or more parameters to a control entity, the one or more parameters reflecting receiver sensitivity capability of the base station;
receiving receiver sensitivity adjustment information from the control entity, wherein the receiver sensitivity adjustment is determined based on the one or more parameters reflecting receiver sensitivity capability of the base station and a target uplink and downlink coverage imbalance level of the base station, wherein the target uplink and downlink coverage imbalance level is not zero; and
adjusting receiver sensitivity of the base station based on the receiver sensitivity adjustment information.

2. The method of claim 1, wherein the one or more parameters include at least one of the following parameters of the base station:
maximum transmit power;
receiver sensitivity adjustment capability;
minimum receiver sensitivity capability;
maximum receiver sensitivity capability;
receiver diversity gain; and
receiver class.

3. The method of claim 1, wherein the one or more parameters are transmitted in an Audit Response message.

4. The method of claim 1, wherein the receiver sensitivity adjustment information is received in at least one of a Cell Setup Request message and a Cell Reconfiguration Request message.

5. The method of claim 1, wherein the receiver sensitivity adjustment information includes at least one of a receiver sensitivity adjustment value, a receiver sensitivity value, a noise figure adjustment value, and a noise figure value.

6. The method of claim 1, wherein the base station is a low power node.

7. The method of claim 1, further comprising transmitting the target uplink and downlink coverage imbalance level of the base station to the control entity.

8. A method of a base station, comprising:
receiving receiver sensitivity information from at least one other base station; and
adjusting receiver sensitivity of the base station based, at least in part, on the receiver sensitivity information and a target uplink and downlink coverage imbalance level of the base station.

9. The method of claim 8, wherein the receiver sensitivity information includes at least one of the following parameters of the at least one other base station:
maximum transmit power;
receiver sensitivity adjustment capability;
minimum receiver sensitivity capability;
maximum receiver sensitivity capability;
receiver diversity gain; and
receiver class.

10. The method of claim 8, further comprising transmitting receiver sensitivity information of the base station to the at least one other base station.

11. The method of claim 10, wherein the receiver sensitivity information of the base station is transmitted in a Load Information message.

12. The method of claim 8, wherein the receiver sensitivity information is received in a Load Information message.

13. The method of claim 8, further comprising transmitting receiver sensitivity adjustment information to the at least one other base station.

14. The method of claim 13, wherein the base station is a macro node, and the at least one other base station includes a low power node.

15. The method of claim 13, further comprising receiving the target uplink and downlink coverage imbalance level from the at least one other base station.

16. A method of a user equipment, comprising:
receiving receiver sensitivity information of a base station, wherein the receiver sensitivity information is received in a message for updating uplink open loop power control parameters; and
adjusting, in response to the receiving, a transmit power of the user equipment based on the receiver sensitivity information.

17. The method of claim 16, wherein the receiver sensitivity information is received from a control entity.

18. The method of claim 16, wherein the receiver sensitivity information is received from the base station.

19. A method of a control entity, comprising:
receiving receiver sensitivity capability information from a base station;
determining a receiver sensitivity adjustment value associated with the base station based on the receiver sensitivity capability information from a base station and a target uplink and downlink coverage imbalance level of the base station, wherein the target uplink and downlink coverage imbalance level is not zero; and
transmitting, in response to the determining, the receiver sensitivity adjustment value to the base station.

20. The method of claim 19, further comprising transmitting one or more parameters to a user equipment, wherein the one or more parameters reflect the receiver sensitivity adjustment value associated with the base station.

21. The method of claim 20, wherein the one or more parameters are transmitted in a message associated with updating uplink open loop power control parameters.

22. The method of claim 19, wherein the control entity is a radio network controller (RNC).

23. A base station configured to:
transmit one or more parameters to a control entity, the one or more parameters reflecting receiver sensitivity capability of the base station;
receive receiver sensitivity adjustment information from the control entity, wherein the receiver sensitivity adjustment is determined based on the one or more parameters reflecting receiver sensitivity capability of the base station and a target uplink and downlink coverage imbalance level of the base station, wherein the target uplink and downlink coverage imbalance level is not zero; and
adjust receiver sensitivity of the base station based on the receiver sensitivity adjustment information.

24. A base station configured to:
receive receiver sensitivity information from at least one other base station; and
adjust receiver sensitivity of the base station based, at least in part, on the receiver sensitivity information and a target uplink and downlink coverage imbalance level of the base station, wherein the target uplink and downlink coverage imbalance level is not zero.

25. A user equipment configured to:
receive receiver sensitivity information of a base station, wherein the receiver sensitivity information is received in a message for updating uplink open loop power control parameters; and
adjust, in response to the receiving, a transmit power of the user equipment based on the receiver sensitivity information.

26. A control entity configured to:
receive receiver sensitivity capability information from a base station; and
determine a receiver sensitivity adjustment value associated with the base station based on the receiver sensitivity capability information from a base station and a target uplink and downlink coverage imbalance level of the base station, wherein the target uplink and downlink coverage imbalance level is not zero; and
transmit, in response to the determining, the receiver sensitivity adjustment value to the base station.

* * * * *